UNITED STATES PATENT OFFICE.

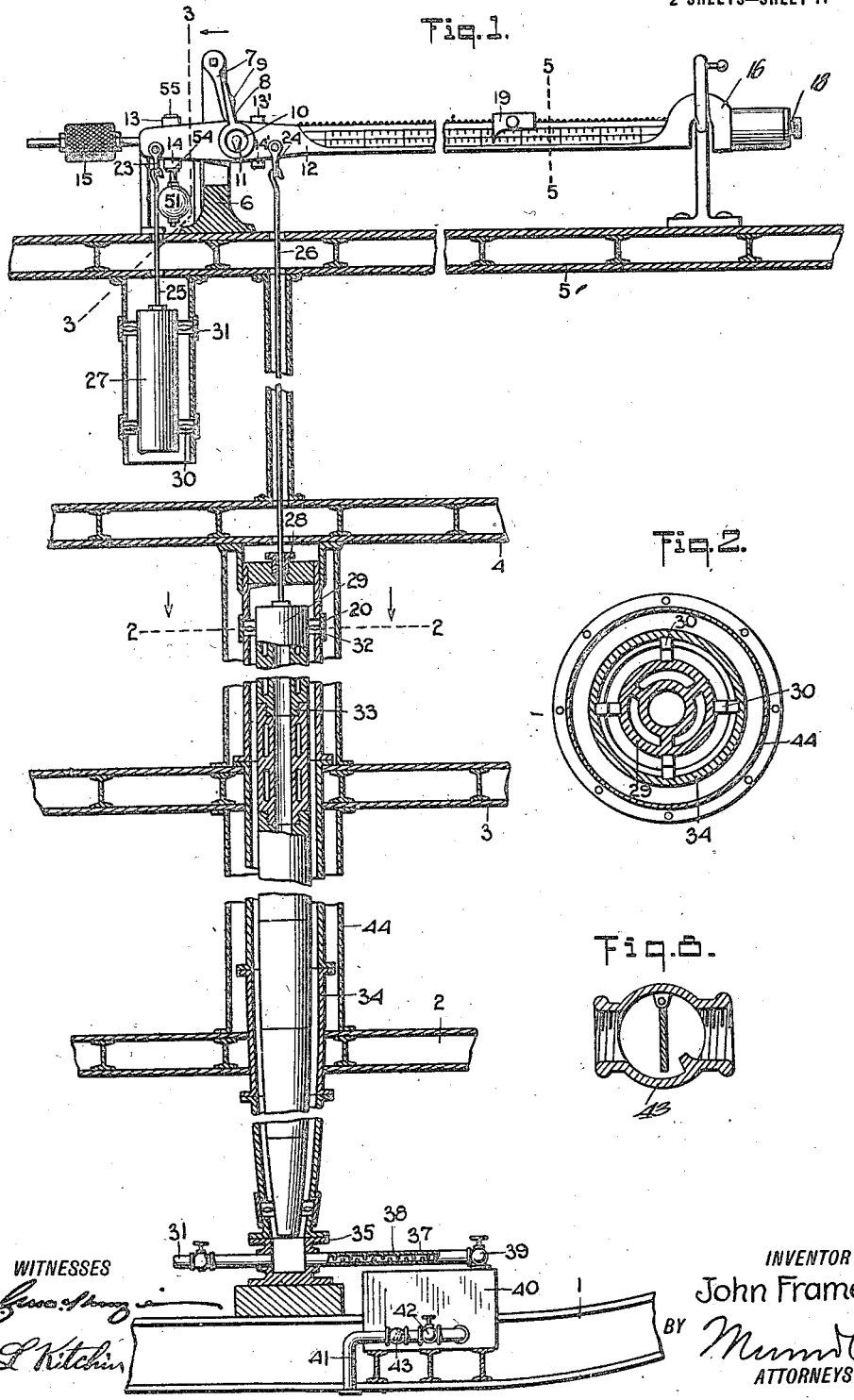

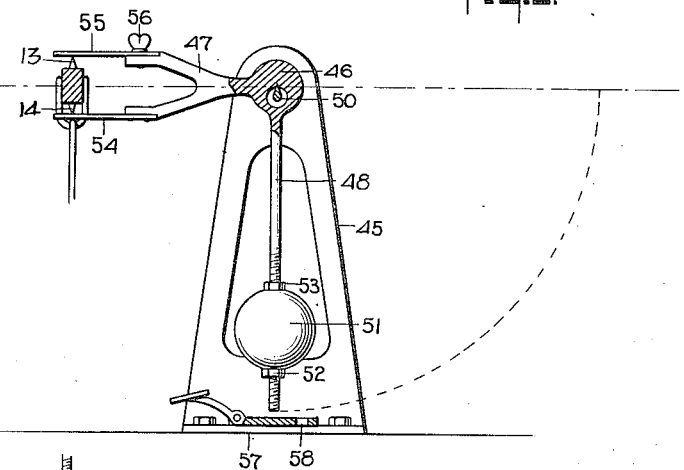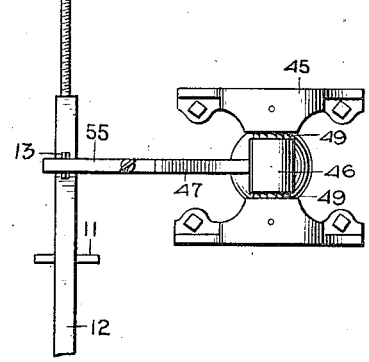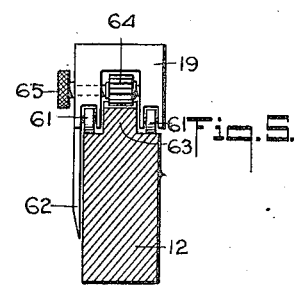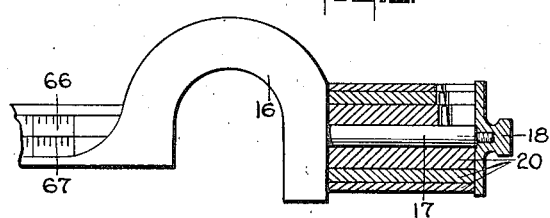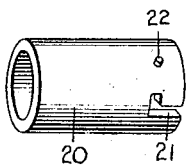

JOHN FRAME, OF SEARSPORT, MAINE.

SHIP-SCALE.

1,182,672.　　　　　Specification of Letters Patent.　　　Patented May 9, 1916.

Application filed March 10, 1915. Serial No. 13,535.

*To all whom it may concern:*

Be it known that I, JOHN FRAME, a citizen of the United States, and a resident of Searsport, in the county of Waldo and State of Maine, have invented a new and Improved Ship-Scale, of which the following is a full, clear, and exact description.

This invention relates to improvements in scales, and particularly to a scale adapted for weighing a ship, and the cargo while in the ship.

The object in view is to provide an improved arrangement whereby a correct weight may be secured of the load as the same is placed in the ship regardless of the position of the load and of the scale.

Another object of the invention is to provide a ship scale arranged with means for compensating for the pitching of the ship during the loading so that a correct reading may be presented regardless of whether or not the ship is on an even keel.

A further object of the invention is to provide a scale for ships arranged with a submerged weight or plunger and an unsubmerged weight acting against the submerged weight so that a correct reading may be provided upon the beam connected with the weights according to the degree of submergence of the plunger.

A still further object of the invention is to provide an improved arrangement of means for preventing fluctuations of the submerging element.

In the accompanying drawings—Figure 1 is a fragmentary detailed sectional view through part of a ship with an embodiment of the invention applied thereto, certain parts being broken away for better illustrating the construction; Fig. 2 is a section through Fig. 1 on line 2—2, the same being on an enlarged scale; Fig. 3 is an enlarged detailed fragmentary sectional view through Fig. 1 on line 3—3; Fig. 4 is a fragmentary top plan view; Fig. 5 is a detailed sectional view through Fig. 1 on line 5—5, the same being on an enlarged scale; Fig. 6 is an enlarged detailed fragmentary view of the front end of the scale beam shown in Fig. 1, part being shown in section for better illustrating the construction; Fig. 7 is a perspective view of one of the scale beam weights.

Fig. 8 is a longitudinal vertical section through a check valve embodying certain features of the invention.

Referring to the accompanying drawings by numerals, 1 indicates the bottom of a ship and 2, 3, 4 and 5 decks of a ship. Arranged on the deck 5 is a standard 6 of any suitable kind which is provided with a depending member 7 to which is secured a yoke 8 by any means, as for instance a bolt 9. Yoke 8 is provided with eyelets 10 into which the knife bearings 11 project, said knife bearings being formed integral with or rigidly secured to the scale beam 12. This provides a proper pivotal mounting for the beam 12. Connected with the beam 12 are knife edges 13 and 14 which co-act with certain members hereinafter fully described. Beam 12 is provided with a counterbalance 15 of any suitable kind, and at the front with a hook member 16 of the usual construction which is adapted to receive a pin or bolt 17 to which is secured a retaining plate 18. The pin 17 may be threaded into the beam 12 or secured thereto in any desired manner. The beam 12 also accommodates a slide weight 18 hereinafter fully described which is moved back and forth over the beam as desired. After the weight 19 has been moved to hook 16 the first time the pin 17 and end plate 18 are then fitted into place as shown in Fig. 6 and weight 19 moved back to the starting point. Upon the second movement of weight 19 to the outer end of the beam a sleeve 20 is fitted over pin 17 and then weight 19 moved back to the starting point a second time. This movement of the weight 19 and the addition of sleeves 20 is continued until the ship has been completely loaded, each sleeve 20 being equal to the weight 19 when the same is at the outer end of beam 12. When any of the sleeves 20 are applied or removed end plate 18 must be removed and then replaced as the same presents locking means for holding the sleeves against accidental removal. In order that the sleeves 20 may be properly held in place each of these sleeves is provided with a bayonet slot 21 and a pin 22, whereby they may be interlocked. A suitable pin 22 is arranged on the pin or bolt 17 for receiving the first sleeve 20.

Pivotally connected to beam 12 on opposite sides of the knife 11 are links 23 and 24 (Fig. 1) for receiving the hook end of rods 25 and 26. Rod 26 extends through a suitable bearings 28 connected with casing 34, and is connected with a plunger 29. The plunger 29 and weight 27 are each held in position by what may be termed frictionless knife-edged bearing members 30. Any desired number of these bearing members may be arranged adjacent each end of each of the weights so that even the slightest pull on the weights by rods 25 and 26 will cause an actuation of the respective weights. Suitable plates or socket members 31 and 32 are provided for the various members 30. Weight 27 is adapted to be open to the atmosphere, and therefore in position to respond to gravity attraction while the plunger 29 is always partially submerged in a fluid and thereby produces a greater or less pull on link 24 and beam 12 according to the degree of submergence of the weight. Weight 29 is preferably made of a plurality of sections connected together by suitable threaded extensions 33 as shown in Fig. 1, these sections being arranged so that the entire weight will taper substantially from the top to the bottom. A weight 29 is arranged in the casing 34 constructed in sections, preferably in order to allow an easy assemblage thereof. The various sections of the casing 34 may be secured together in any desired manner, as for instance, by rivets or bolts, and also may be secured in any suitable manner to the ship, the particular way of securing the same in position forming no part of the present invention. The bottom section 35 of the casing 34 is provided with an inlet pipe 36 through which the liquid in the casing is introduced, which liquid is preferably an oil. Arranged opposite the inlet pipe 36 is a pipe 37 having a plurality of baffling members 38 which prevent the rapid surging back and forth of fluid through pipe 37 and thereby prevent the action of the waves exterior of the ship from affecting the level of the fluid in the casing 34. A link 39 connects pipe 37 with a tank 40, which tank contains a sufficient quantity of oil for filling the entire casing 34. A pipe 41 leads from the exterior of the ship to the interior of the tank 40 so that water may freely flow into the tank and out of the tank. A shut-off valve 42 is inserted in pipe 41, and also a check valve 43 is inserted in pipe 41. The check valve may be of any desired kind, as for instance, a flap valve, and is arranged to open in a direction away from tank 40 so that the fluid in the tank 40 may at any time freely flow out of the tank 40 into the pipe 41 and from this to a position below the ship. The check valve normally stands slightly open so that if desired a small steady flow of water may pass in either direction, but if the vessel should suddenly toss or there should be a large wave pass the ship the inrushing water would immediately close the check valve and the level of the oil in casing 34 would not be affected. A jacket 44 may be provided for casing 34, the same acting as a protecting member for the various parts of the casing.

When a scale has been connected with a ship as above described and a predetermined load has been placed in the ship, water will gradually flow into tank 40 and oil will flow from tank 40 into casing 34 which will make the iron weight 29 more buoyant and thereby allow the weight 27 to raise the outer end of beam 12. The shift weight 19 is then moved until the beam 12 balances, whereupon the weight of the load placed in the ship will be ascertained. If an additional load is now placed in the ship an additional amount of water will pass into tank 40 and another supply of oil will enter casing 34 and further submerge weight 29 which will increase the buoyancy of the same. This will necessitate a further movement of the weight 19 for causing a balancing of the beam 12. In positioning the scale in a ship it is designed to arrange the same so that the lower members 30 will be continually submerged in the oil or other fluid used and the upper members 30 will be continually above the fluid in casing 34.

If the scale is arranged centrally of the ship the various constructions above described will be sufficient to properly show at any time the weight of the ship and the contents. However, it is not always feasible to place the scale in a central position. When the scale is placed to the rear of the center of the ship, as for instance, two thirds of the way back from the bow, the scale will act properly as long as the ship is on an even keel. However, it is not unusual to load the prow of the ship first and thereby cause the ship to dip toward the front and thus bodily raise the rear of the ship including the scale. This movement will of course cause the scale to assume a certain angle different from its original position.

In order to correct the reading of the scale beam a compensating mechanism is shown in Figs. 3 and 4. Referring to these figures, 45 indicates a standard of any suitable construction preferably a standard having a pair of uprights as shown in Fig. 4 between which is arranged a journal member 46, which journal member merges into a bifurcated construction 47 and a depending bar 48. Suitable anti-friction members 49 are arranged at the opposite ends of member 46 for reducing the friction to a minimum. Member 46 is mounted upon a knife bearing 50 secured to standard 45 as shown in Fig. 3 so that bar 48 may continually remain in a vertical position, the same being assisted by a weight 51, held in position by suitable nuts 52 and 53, which nuts may be adjusted for increasing or decreasing the leverage. A spring bar 54 is connected to the lower arm of the bifurcation 47 and a spring bar 55 is removably secured to the upper end of bifurcation 47 by a thumb screw 56. When the compensating mechanism in Figs. 3 and 4 is not in use thumb screw 56 is loosened and the spring bar 55 turned to a position substantially at right angles to that shown in Fig. 3, after which bar 48 is moved to one side and the locking lever 57 raised until the lower end of bar 48 projects through aperature 58, whereupon the entire device will be held out of operation and spring 54 will be held an appreciable distance from the beam 12. The lever 57 may be pivoted in any suitable manner, as for instance, by having the journal thereof mounted in bearings formed on the standard 45. When the compensating mechanism is to be used the same is arranged as shown in Figs. 1, 3 and 4, whereby the spring bars 54 and 55 engage or almost engage the knife edges 13 and 14. If the front of the ship is loaded until the ship dips to the front weight 51 and associated parts will swing toward the front and thereupon cause spring 55 to press against knife edge 14, whereupon the weight 27 will be assisted in proportion to the amount of pitching of the vessel. If the rear or stern of the vessel is lowered first until the same causes the prow to rise up somewhat, weight 51 will automatically swing toward the stern and thus raise spring bar 54 and act against weight 27, thus assisting the plunger 29, this assistance being in proportion to the amount of movement of the ship. In case the scale was arranged in front of the center of the ship the spring bars 54 and 55 and associated parts would be arranged in front of the standard 6 so that the spring bars would engage the knife edges 13' and 14'. Various readjustments and modifications may be made without departing from the spirit of the invention provided the same retain the characteristics above described.

In Fig. 5 will be seen a detailed view of the sliding weight 19 wherein it will be observed that the same is provided with traction wheels 61, and with a depending pointer 62. The beam 12 is provided with a rack 63 which is engaged by a gear 64. A shaft and thumb member 65 are connected with gear 64 so that the weight may be easily moved along the scale beam. In connection with the scale beam, it is to be noted that the same is provided with a line of graduations 66 (Fig. 6) indicating pounds, tons, and the like, while a second set of graduations 67 are provided for indicating feet. By this arrangement not only the weight of the load is ascertained, but the distance from the water line of the ship to the keel is known.

What I claim is—

1. In a ship scale of the class described, a pivotally mounted beam, a counter weight therefor, a plunger connected with said beam designed to overcome said counter weight, a casing surrounding said plunger, means for providing a communication between said casing and the bottom of the ship whereby water has access to said casing, said means including a tank for receiving a quantity of oil, whereby the water entering said tank will force the oil into said casing for surrounding said plunger in order to reduce the attraction by gravity whereby said conterbalancing weight will overbalance said beam, the counteraction of gravity being in proportion to the depth of oil in the casing, and a sliding weight arranged on said beam, said weight being adapted to be moved until the beam is evenly balanced in order to indicate the proper weight.

2. In a ship scale of the class described, a pivotally mounted scale beam, a sliding weight arranged on said beam adapted to act in the usual manner of weights of this kind, a comparatively heavy counterbalancing weight designed to maintain said scale beam in its tilted or raised position, a plunger adapted to normally overcome the action of said counterbalancing weight, a casing surrounding said plunger, an oil tank arranged adjacent the bottom of said casing, means providing a passageway between the upper part of said oil tank and the lower part of said casing, means for directing water from the bottom of the ship into said oil tank, whereby the level of the oil is raised and the action of gravity on said plunger is reduced, whereby said scale beam will be evenly balanced, the addition of weight to said ship causing a greater submergence of the ship and the consequent relative rising of the oil level in said casing whereby the counterbalancing weight will overcome the action of the plunger, the degree of movement of the scale beam being in proportion to the weight placed on the ship.

3. In a ship scale beam of the class described, a pivotally mounted scale beam, a comparatively heavy counterbalancing weight, a plunger pivotally connected with said scale beam on the opposite side of the pivotal mounting of the beam of said weight, a casing inclosing said plunger, knife bearings engaging the plunger and guiding the same in its movement, an oil tank arranged adjacent the bottom of the ship on which the scale is mounted for supplying oil to said casing, means for providing communication between the bottom of the tank and the bottom of the ship whereby water may freely enter into said oil tank and cause the oil to rise in said casing, said oil varying the gravital attraction of said plunger according to the depth of the oil, and a sliding weight arranged on said scale beam.

4. In a ship scale of the class described, a pivotally mounted beam, a counterbalance connected with said beam, a plunger connected with said beam and acting in opposition to said counterbalance, means for submerging said plunger according to the submergence of the ship on which the scale is mounted so that the plunger will vary its action on the beam according to the depth of the ship in the water, and a compensating mechanism provided with a pair of arms arranged adjacent said beam, and a pendulum for causing said arms to act against said beam in proportion to the movement of the ship from an even keel.

In testimony whereof I have signed my name to this specification in the presence of two subscribing witnesses.

JOHN FRAME.

Witnesses:
A. H. NICHOLS,
JAS. A. COLSON.